(12) United States Patent
Jamison et al.

(10) Patent No.: US 7,516,990 B2
(45) Date of Patent: Apr. 14, 2009

(54) FLUID CONDUIT SYSTEM AND FITTINGS THEREFOR

(75) Inventors: Tommy L Jamison, Hernando, MS (US); H. Glenn Dennis, Collierville, TN (US); Kevin Gay, Brighton, TN (US)

(73) Assignee: Mueller Industries, Inc., Memphis, TN (US)

( * ) Notice: Subject to any disclaimer, the term of this patent is extended or adjusted under 35 U.S.C. 154(b) by 763 days.

(21) Appl. No.: 10/739,983

(22) Filed: Dec. 18, 2003

(65) Prior Publication Data

US 2004/0227346 A1    Nov. 18, 2004

Related U.S. Application Data

(60) Provisional application No. 60/470,599, filed on May 15, 2003.

(51) Int. Cl.
*F16L 13/14* (2006.01)
(52) U.S. Cl. .................. 285/382; 285/256; 285/351
(58) Field of Classification Search .......... 285/256, 285/382, 351, 239, 241, 242, 252, 370
See application file for complete search history.

(56) References Cited

U.S. PATENT DOCUMENTS

| | | | |
|---|---|---|---|
| 1,911,755 A | | 5/1933 | Grover |
| 2,192,914 A | | 3/1940 | Ice |
| 2,346,051 A | | 4/1944 | Seamark |
| 3,068,563 A | | 12/1962 | Reverman |
| 3,222,094 A | * | 12/1965 | Hill et al. ............ 285/256 |
| 3,343,252 A | | 9/1967 | Reesor |
| 3,363,680 A | * | 1/1968 | Baker ............ 165/158 |
| 3,434,900 A | | 3/1969 | Bender |
| 3,579,794 A | | 5/1971 | Powell |
| 3,689,112 A | * | 9/1972 | Slator et al. .......... 285/39 |
| 4,715,624 A | * | 12/1987 | Frye ............ 285/55 |
| 4,726,612 A | * | 2/1988 | Picton ........... 285/256 |
| 4,850,621 A | * | 7/1989 | Umehara .......... 285/322 |
| 4,858,967 A | * | 8/1989 | Tremoulet et al. .......... 285/256 |

(Continued)

FOREIGN PATENT DOCUMENTS

AU          281980       6/1963

(Continued)

OTHER PUBLICATIONS

KITEC: Best of Both Worlds! Mar. 2000 IPEX Mktg Svcs © 2000 IPEX Inc.

(Continued)

*Primary Examiner*—David E Bochna
(74) *Attorney, Agent, or Firm*—Harness, Dickey & Pierce, P.L.C.

(57) ABSTRACT

A fluid conduit system that employs fittings having ends with a structural portion and a seal portion. The ends of the fittings are inserted into a tube, which may be a hard, i.e., rigid, or soft, i.e., flexible, tube. The seal portion sealingly engages the inner diameter of the tube upon its insertion into the tube. The tube is deformed to prevent the fitting from being withdrawn from the tube; the portion of the tube in the immediate vicinity of each seal that forms the seal portion is not deformed. A method for forming a fluid conduit system is also provided.

17 Claims, 10 Drawing Sheets

U.S. PATENT DOCUMENTS

| | | | |
|---|---|---|---|
| 5,044,671 A * | 9/1991 | Chisnell et al. | 285/55 |
| 5,378,023 A * | 1/1995 | Olbrich | 285/24 |
| 5,484,174 A * | 1/1996 | Gotoh et al. | 285/382.2 |
| 5,829,795 A * | 11/1998 | Riesselmann | 285/256 |
| 5,890,287 A * | 4/1999 | Fukaya | 29/890.14 |
| 5,944,359 A * | 8/1999 | Andronaco | 285/55 |
| 6,059,338 A | 5/2000 | Diederichs | |
| 6,082,784 A * | 7/2000 | Fukaya | 285/382 |
| 6,099,045 A * | 8/2000 | Pirona | 285/256 |
| 6,145,892 A * | 11/2000 | Weber | 285/259 |
| 6,241,290 B1 | 6/2001 | Foering et al. | |
| 6,260,891 B1 | 7/2001 | Foering et al. | |
| 6,427,309 B1 | 8/2002 | Viegener | |
| 6,477,757 B2 | 11/2002 | Viegener | |
| 7,237,809 B2 * | 7/2007 | Connell | 285/382 |
| 2002/0050041 A1 | 5/2002 | Viegener | |

FOREIGN PATENT DOCUMENTS

| | | |
|---|---|---|
| CH | 648 643 | 12/1978 |
| CH | 682942 A5 * | 12/1993 |
| DE | 7406802 | 7/1974 |
| DE | 9113050.6 | 10/1991 |
| EP | 530404 A1 * | 3/1993 |

OTHER PUBLICATIONS

Deutsche Alwa BmbH "Cufix Manschetten Preβfittings," Sep. 1993 pp. 11-14.

* cited by examiner

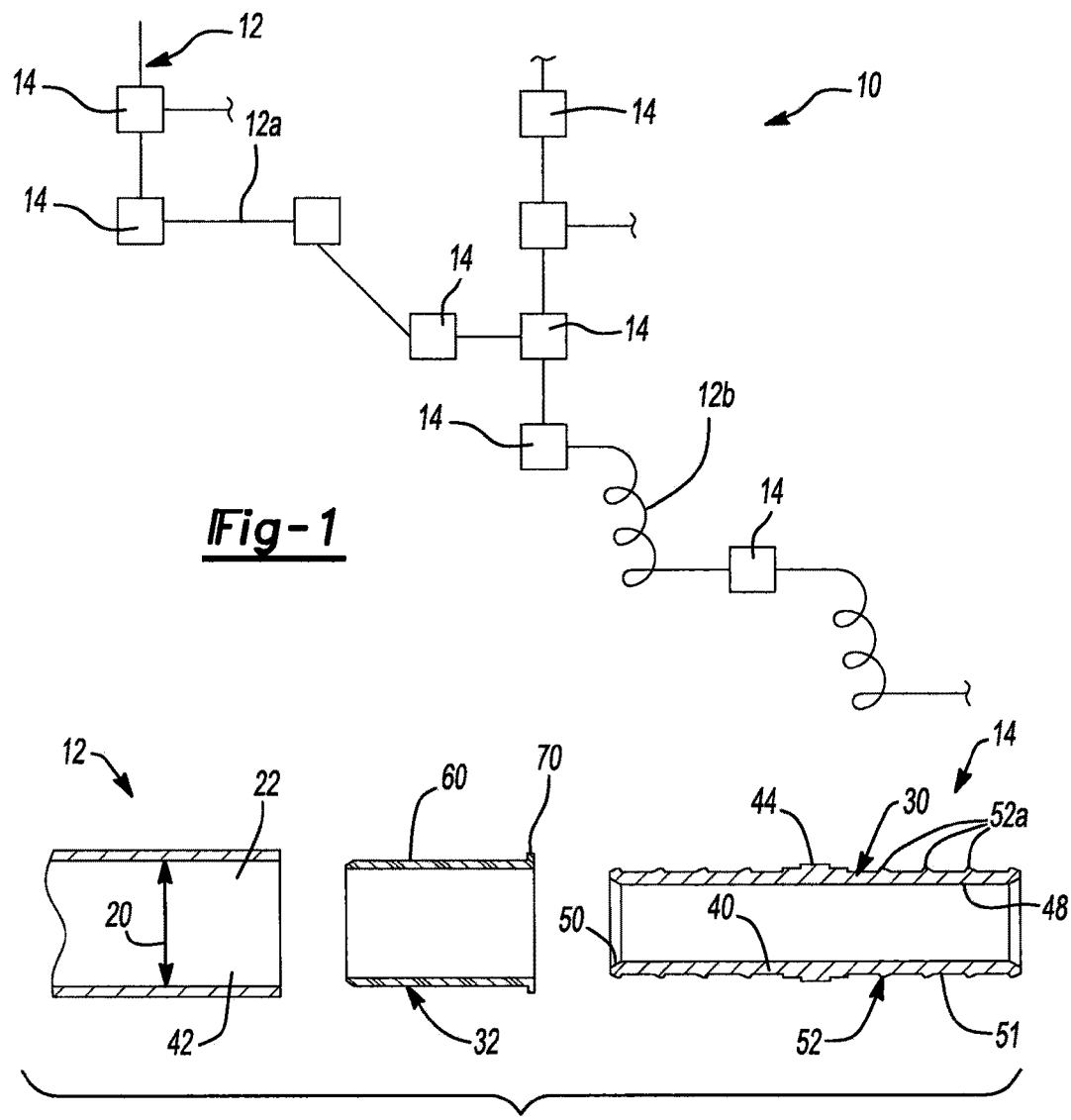
Fig-1
Fig-2
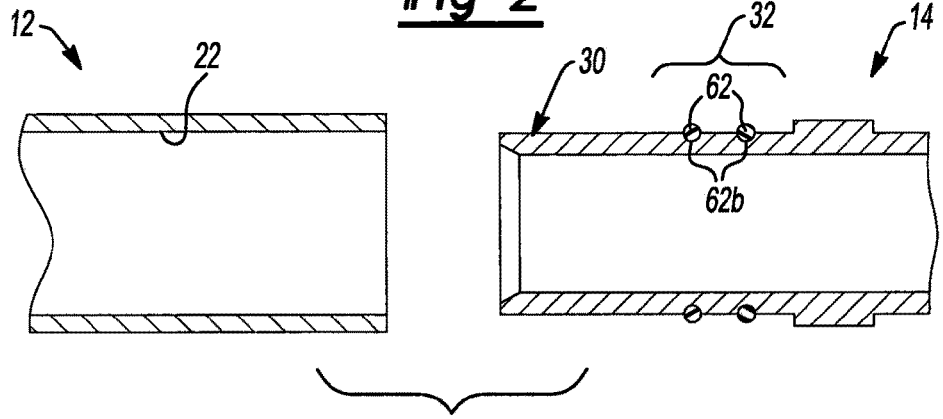
Fig-3

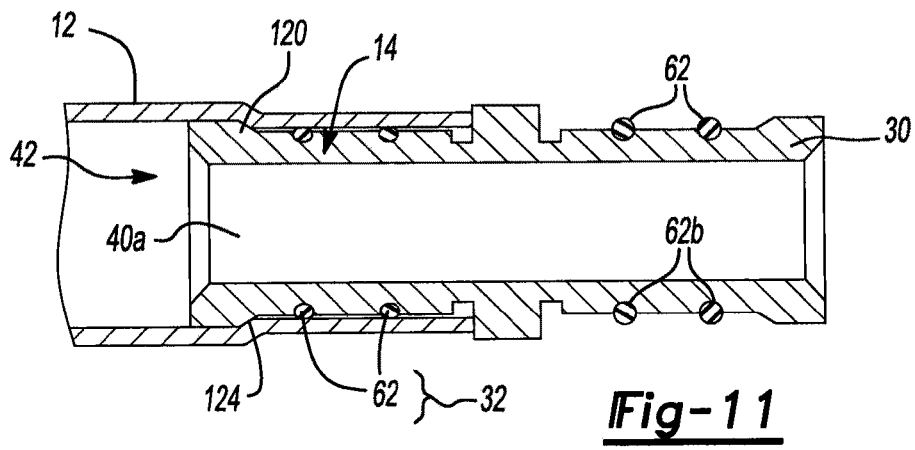
_Fig-11_
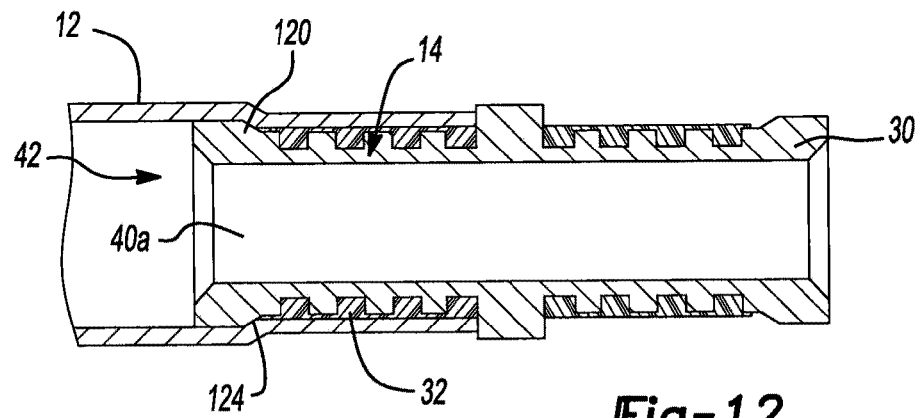
_Fig-12_
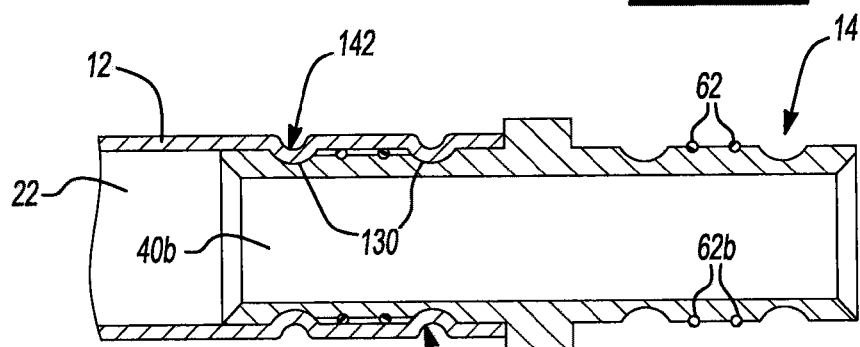
_Fig-13_
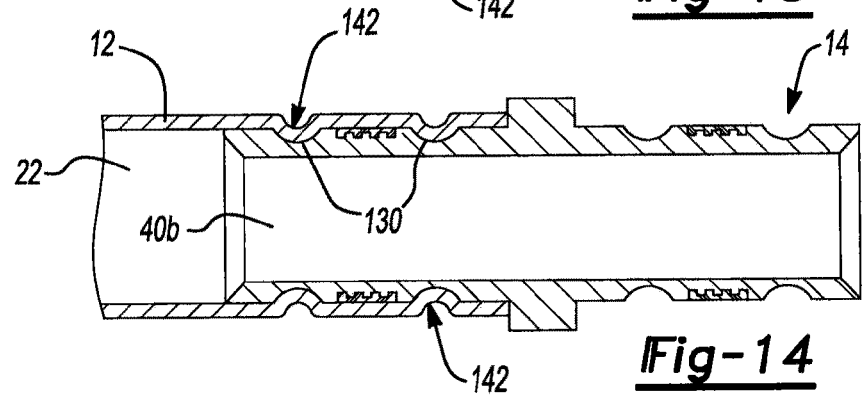
_Fig-14_

FLUID CONDUIT SYSTEM AND FITTINGS THEREFOR

CROSS-REFERENCE TO RELATED APPLICATIONS

This application claims the benefit of U.S. Provisional Application Ser. No. 60/470,599 filed May 15, 2003.

FIELD OF THE INVENTION

The present invention generally relates to fluid conduit systems that may be employed, for example, for routing and delivering potable water, gases or chemicals.

BACKGROUND OF THE INVENTION

Sweat soldering has long been used for the supply and distribution of potable water, especially in single family residential constructions, due to its durability and the relative ease with which solder connections were made. Modern changes to various plumbing codes, which mandate lead-free solders and water soluble fluxes, have, however, greatly increased the difficulty in making sweat solder connections as these lead-free solders and water soluble fluxes tend to be less tolerant of certain variables (e.g., the presence of oxidation or the use of excessive heat) than the lead-based solders and acid-based fluxes that had been previously used.

Furthermore, the sweat soldering task is relatively time consuming as compared to the crimp-type connections that are employed in a PEX (i.e., cross-linked polyethylene) system. A PEX system utilizes lengths of plastic PEX tubing, barbed fittings (which are inserted into the PEX tubing) and collars that are employed to crimp the tubing to the fitting. As the crimping operation may be accomplished in roughly ¼ to ½ the time that is necessary to complete the soldering of a sweat solder joint, plumbing contractors have observed the potential for substantial savings in labor costs by utilizing a PEX system.

In an effort to eliminate the disadvantages of sweat solder connections, manufacturers such as Viega, have introduced fittings that may be crimped directly to conventional lengths or sticks of hard drawn copper tubing. The ProPress system marketed by Viega includes an inner O-ring seal that is carried on the inner diameter of the fitting; the O-ring sealingly engages the tubing upon insertion of the tube into the fitting. A crimping tool is subsequently employed to crimp the fitting to thereby fix the fitting and the tube to one another. This system, however, is known to suffer from several drawbacks.

One such drawback concerns the sealing of the fitting to the outside surface of the copper tubing. It is well known in the art that the outside surface of a copper tube is relatively susceptible to imperfections during its formation via extrusion, such as gouges or scratches, as well as relatively susceptible to damage during shipping and storage. As such imperfections and damage may adversely affect the ability of the fittings to seal against the outer surface of the tubing, manufacturers of the copper tubing typically subject the extruded sticks of tubing to an eddy current test to verify the integrity of each stick's outside surface. This testing is costly and as we have found, leaks are possible even when the tubing conforms to published standards. Accordingly, it appears that a relatively time consuming manual inspection must be made of each tube prior to its coupling to a fitting.

Another drawback concerns the incompatibility of the known systems with lengths of annealed copper tubing. In this regard, the annealed copper tubing is readily deformable so that the crimping process fails to secure the fitting and the annealed copper tubing together. Accordingly, plumbing contractors must equip themselves with two discrete sets of fittings: one set of crimp fittings that is compatible with the hard drawn sticks of tubing, and another set (e.g., flare or compression fittings) that are compatible with the annealed coils of tubing.

In view of the aforesaid drawbacks, there remains a need in the art for an improved fluid conduit system that permits the joining of all types of copper tubing with one style of fitting.

SUMMARY OF THE INVENTION

In one form, the present invention provides a fluid conduit system having a fluid conduit, a crimp and a fitting. The crimp is formed on the fluid conduit and has an inside dimension that is smaller than the inner diameter of the fluid conduit. The fitting has a structural portion and a seal portion. The structural portion has at least one crimp groove into which the crimp is at least partially received. The seal portion is carried by the structural portion and sealingly engages the inner diameter of the fluid conduit. The seal portion is axially offset from the crimp groove.

In another form, the present invention provides a method for forming a fluid conduit system. The method includes: providing a fitting having a structural portion and a seal portion, the seal portion being coupled to the structural portion; inserting the structural portion into a tube such that the seal portion sealingly engages an inside surface of the tube; and deforming only the tube to couple the fitting to the tube.

In still another form, the present invention provides a tool for securing a fitting to a tube. The tool includes a jaw and a pair of die members. The jaw is disposed about a first axis and includes a pair of opposed members. Each of the die members is pivotably coupled to an associated one of the opposed members and pivotable about a second axis that is generally perpendicular to the first axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 1 is a schematic illustration of a fluid conduit system constructed in accordance with the teachings of the present invention;

FIG. 2 is an exploded section view of a portion of the fluid conduit system of FIG. 1, illustrating the construction of a fitting constructed in accordance with the teachings of the present invention;

FIG. 3 is an exploded section view similar to FIG. 2 but illustrating another fitting constructed in accordance with the teachings of the present invention;

FIGS. 11 and 12 are sectional views of another style of fitting constructed in accordance with the teachings of the present invention;

FIGS. 13 and 14 are sectional views of yet another style of fitting constructed in accordance with the teachings of the present invention;

DETAILED DESCRIPTION OF THE PREFERRED EMBODIMENTS

Figure 4:
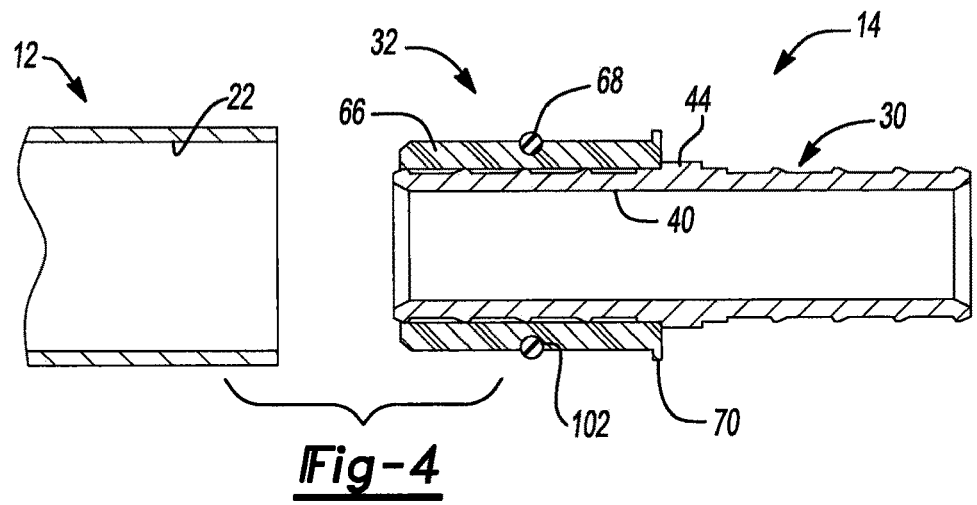
FIG. 4 is an exploded section view similar to FIG. 2 but illustrating yet another fitting constructed in accordance with the teachings of the present invention.

With reference to FIG. 1 of the drawings, an exemplary fluid conduit system constructed in accordance with the teachings of the present invention is generally indicated by reference numeral 10. The fluid conduit system 10 is illustrated to include a plurality of tubes 12 and a plurality of fittings 14 that are employed to join the tubes 12 to one another. In the example provided, the fluid conduit system 10 is employed to route and deliver potable water and as such, the tubes 12 may be constructed of copper and include conventional commercially available hard drawn tubing sticks 12a and conventional soft tubing 12b (also referred to herein as "annealed", or "flexible metal" tubing) of the type that is commercially available in a coiled form from sources such as Mueller Industries, Inc. of Memphis, Tenn. Those skilled in the art will appreciate, however, that the tubes 12 may be made out of any suitable metal or plastic material and that the teachings of the present invention have application to fluid conduit systems that route and deliver other types of fluids, including gases. With reference to FIG. 2, each tube 12 is constructed such that it defines an internal diameter 20 of a predetermined size and it's inside surface 22 is generally smooth and suited for sealing against an associated fitting 14.

The fitting 14 includes a structural portion 30 and a seal portion 32. Those skilled in the art will appreciate that although the particular fitting illustrated is a coupling or union, the teachings of the present invention have applicability to various other types of fittings, including elbows, tees, caps, adapters, reducers, bushings, etc.

The structural portion 30 may be made from any structural material, such as plastic, ceramic, copper, brass, bronze, stainless steel or another metal. In the example provided, the structural portion 30 is made of copper so as to eliminate the potential for a galvanic reaction with the copper of the tubes 12. The structural portion 30 may include a tubular end 40 that is configured to be inserted into an end 42 of an associated tube 12. Optionally, the structural portion 30 may further include an abutting flange 44 that abuts the tubular end 40 and which may serve as a "stop" that limits the distance in which the tubular end 40 may be inserted into the tube 12.

The inner surface 48 of the tubular end 40 may be smooth and may include a chamfer 50 or similar feature that is configured to minimize turbulence and pressure losses, while the outside surface 51 of the tubular end 40 may include one or more discontinuities 52. Where employed, each discontinuity 52 aids in axially fixing the tubular end 40 to the seal portion 32 and as such may be a step, a groove or recess, a tooth-like feature or a barb-like feature, for example, that abuts or engages the seal portion 32. In the example provided, we employed four equally spaced apart barbs 52a that are tapered to facilitate the insertion of the tubular end 40 into the seal portion 32, but which tend to engage the seal portion 32 to thereby inhibit the axial separation or withdrawal of the tubular end 40 from the seal portion 32.

Those skilled in the art will appreciate from this disclosure, however, that despite the discrete and independent construction of the seal portion 32 in the particular embodiment illustrated, various other processes may be employed to fabricate the seal portion 32 and couple it to the tubular end 40. For example, overmolding may be employed to form the seal portion 32 directly onto the tubular end 40 of the structural portion 30.

The seal portion 32 is engaged to the tubular end 40 and may be configured to seal against both the inside surface 22 of the tube 12 and the outside surface 51 of the tubular end 40. In the particular embodiment illustrated, the seal portion 32 is a collar or sleeve 60 that may be made of a suitable material, such as nylon, TEFLON®, EPDM, or a material permitted under NSF 61 standards. Those skilled in the art will appreciate, however, that the seal portion 32 could be otherwise configured. For example, the seal portion 32 may include one or more seal members, such as O-rings 62, as illustrated in FIG. 3, or may include a sleeve 66 that carries one or more seal members 68 as illustrated in FIG. 4. Furthermore, in those embodiments that employ a seal portion 32 with a sleeve (e.g., sleeve 60 or sleeve 66), the sleeve could be configured with an annular collar 70 as shown in FIGS. 2 and 4, which may be configured to abut (and optionally seal against) the end 42 of the tube 12. In these embodiments, the structural portion 30 may include an abutting flange 44 that is positioned against the annular collar 70 opposite the end 42 of the tube 12 to thereby support the annular collar 70 as well as to serve as a "stop" that limits the distance in which the tubular end 40 may be inserted into the tube 12. Alternately or in addition to any of the aforementioned seal configurations, a sealant, such as an anaerobic sealant, may be applied to the fitting 14 and/or the tube 12 to further ensure sealing engagement between the fitting 14 and the tube 12.

Figure 5:
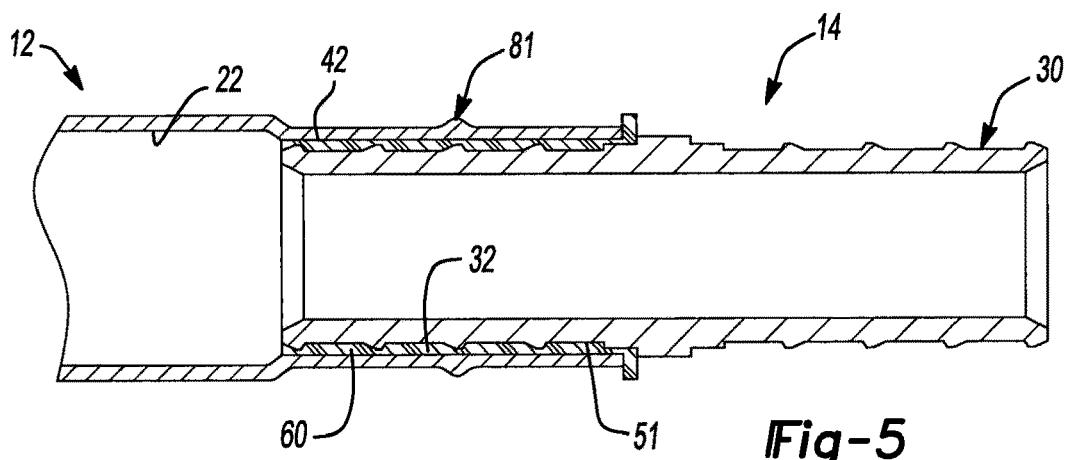
FIG. 5 is a sectional view of a portion of the fluid conduit system of FIG. 1 illustrating the fitting as coupled to a fluid conduit.

Returning to FIG. 2, the fitting 14 in this example may be readily withdrawn from the tube 12 and as such, a means for axially securing the tube 12 and the fitting 14 to one another is necessary. Furthermore, in this example the sleeve 60 does not seal against either the inside surface 22 of the tube 12 or the outside surface 51 of the tubular end 40 upon its insertion into the end 42 of the tube 12, since the sleeve 60 is about 0.002 to about 0.005 inch smaller in diameter than the internal diameter 20 of the tube 12. Accordingly, a tool 80 (FIGS. 6 and 7) is employed in this example to form a crimp 81 or otherwise deform the end 42 of the tube 12 (see, e.g., FIG. 5) to inhibit the withdrawal of the fitting 14 from the tube 12 as well as to cause the sleeve 60 to sealingly engage both the inside surface 22 of the tube 12 and the outside surface 51 of the tubular end 40 of the fitting 14. Employment of the crimp 81 or another such deformation to secure the tube 12 and the fitting 14 to one another is significant in that no flames are employed and the process can be completed on tubing in some instances where a fluid, such as water, is still contained in the tube 12.

Although the crimp 81 has been illustrated as being continuous about the perimeter of the tube 12, those skilled in the art will appreciate from this disclosure that the crimp 81 may be formed otherwise. For example, the crimp 81 may consist of one or more crimp sections that extend about a portion of the perimeter of the tube 12.

Figure 6:
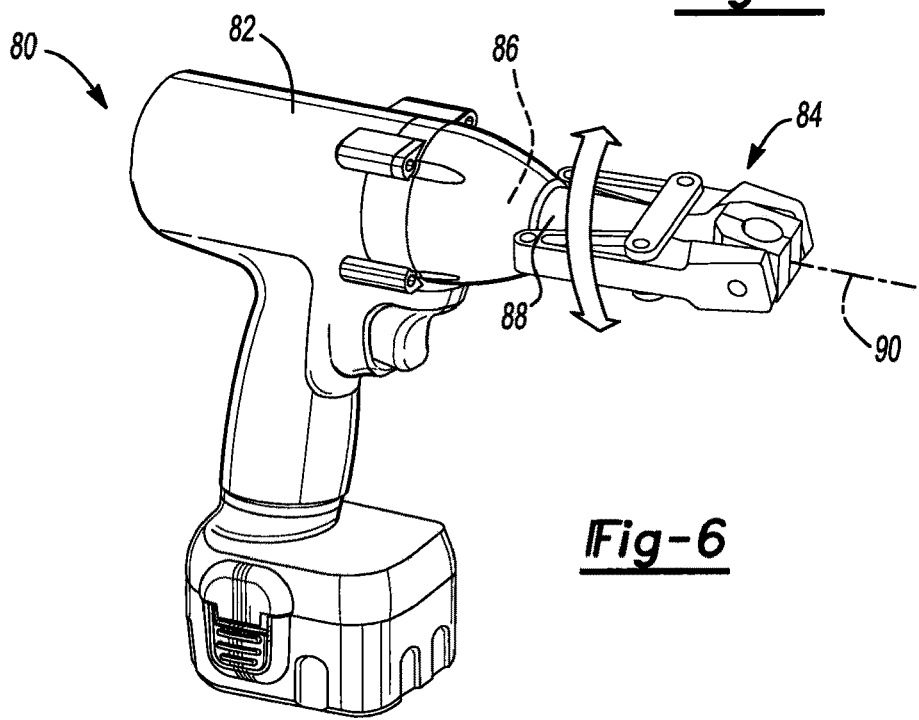
FIG. 6 is a perspective view of a tool for coupling fittings and fluid conduit to one another, the tool being constructed in accordance with the teachings of another aspect of the present invention.
Figure 7:
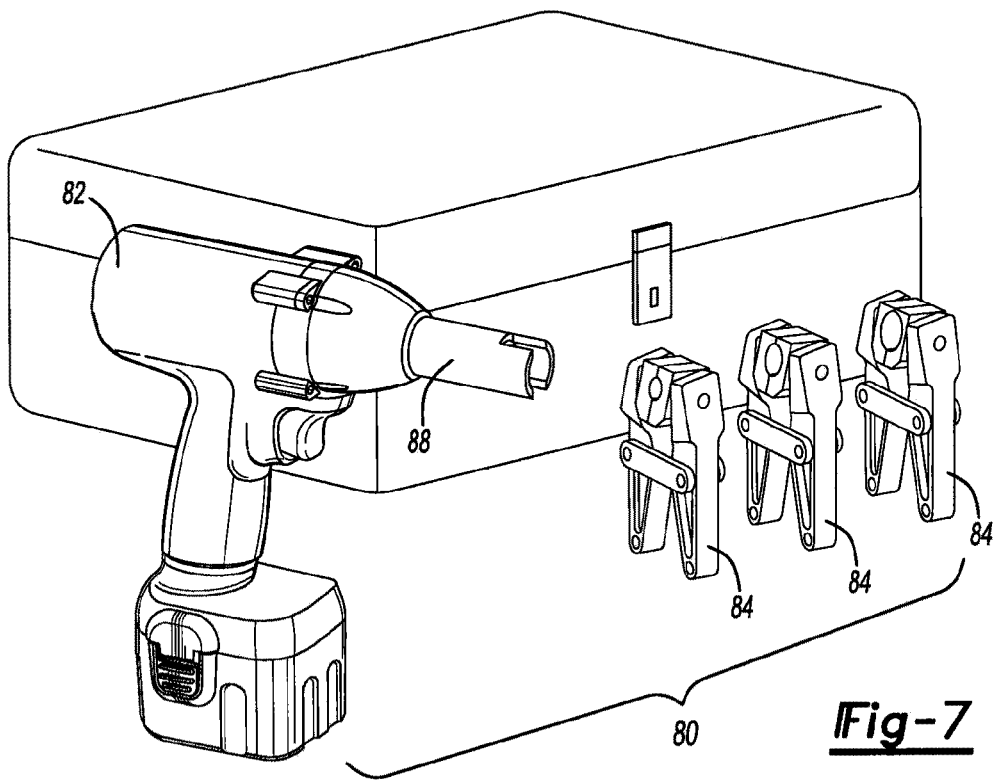
FIG. 7 is another perspective view of the tool of FIG. 6, illustrating the use of a disconnectable jaw assembly.

In FIGS. 6 and 7, a tool constructed in accordance with another aspect of the present invention is generally indicated by reference numeral 80. The tool 80 may include a tool body 82 and a jaw assembly 84. The tool body 82 may be generally similar to a Model 320-E Crimp Tool that is commercially available from the Ridge Tool Company and as such, a detailed discussion of the tool body 82 need not be provided herein. Briefly, the tool body 82 may include a linear actuator 86 that may be selectively actuated to operate the jaw assembly 84. The linear actuator 86 may include a barrel 88, which is optionally rotatable about its longitudinal axis 90. Those skilled in the art will appreciate from this disclosure that the tool body 82 may alternatively be powered in another manner, such as manually or hydraulically. As the plumbing contractor will likely employ several different sizes of tubing, several differently sized jaw assemblies 84 are provided, allowing the plumbing contractor to remove a jaw assembly 84 of one size from the tool body 82 and install a jaw assembly 84 of another size to the tool body 82 as needed.

Figure 8:
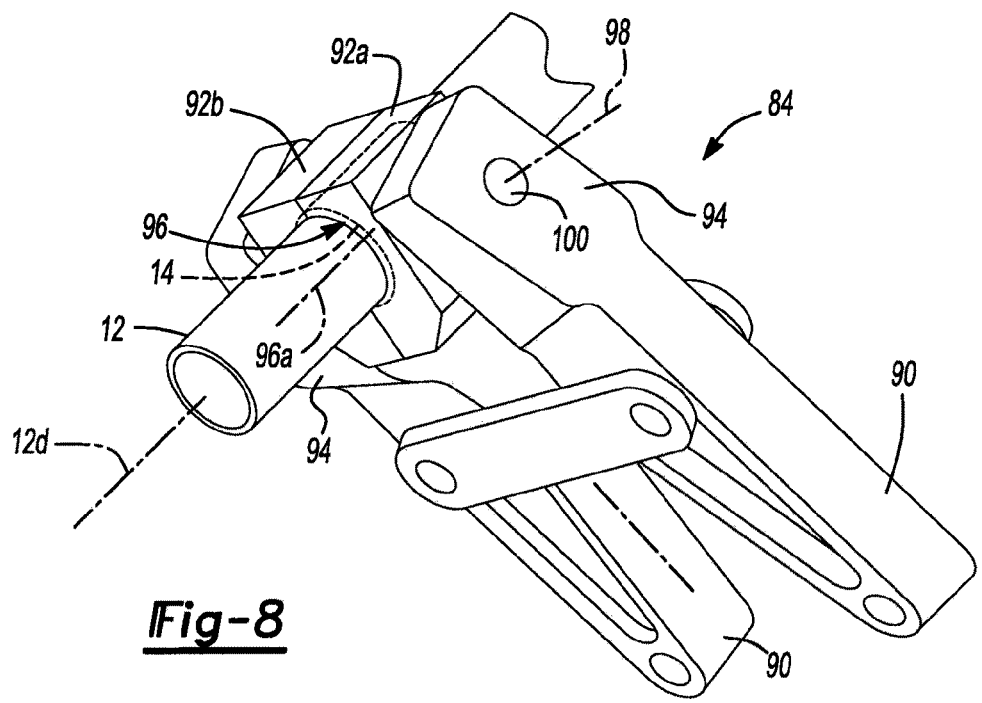
FIG. 8 is a perspective view of a portion of the tool of FIG. 6 illustrating the employment of the tool in a crimping operation.

With additional reference to FIG. 8, the jaw assembly 84 may include a jaw 90 and a pair of discrete die members 92a and 92b. The jaw 90 may include a pair of opposed members 94 that may be coupled to the barrel 88 of the tool body 82. Operation of the linear actuator 86 opens and closes the opposed members 94 in a conventional and well known manner. The die members 92a and 92b cooperate to define a die cavity 96 that delineates the shape and configuration of the crimp or deformation. The die members 92a and 92b may be coupled to the opposed members 94 so as to be pivotable relative to one another about an axis 98 that may be generally normal to the longitudinal axis 90 of the barrel 88. In the particular example provided, each die member 92a and 92b may include a stem 100 that may be inserted into an associated one of the opposing members 94. A fastener, such as a conventional external snap ring (not shown), may be employed to retain the stem 100 to the opposing member 94 in a manner that permits rotation of the stem 100 yet inhibits its withdrawal from the opposing member 94.

Configuration of the jaw assembly 84 with pivotable die members 92a and 92b permits the crimp or deformation to be formed more precisely. More specifically, the die members 92a and 92b tend to self-center on the tube 12 (i.e., so that the longitudinal axis of the die cavity 96 is generally coincident with the longitudinal axis of the tube 12) so that in those instances where the user does not align the jaw 90 absolutely perpendicular to the tube 12, the die members 92a and 92b will pivot upon contact with the tube 12 such that the axis 96a of the die cavities 96 is coincident with the axis 12d of the tube 12 as is illustrated in FIG. 8.

With regard to the embodiments of FIGS. 3 and 4, crimping or deformation of the tube 12 may be employed to secure the fitting 14 to the tube 12 in an axial direction. Depending on the size and sealing capacity of the seal portion 32, however, crimping or deformation in an area proximate the seal portion 32 or portions thereof may be unnecessary or undesirable. In FIG. 3, for example, the O-rings 62 of the seal portion 32, which are located in a seal groove 62b formed in the structural portion 30, are sized to sealingly engage the inside surface 22 of the tube 12 upon insertion of the fitting 14 into the tube 12 so that deformation of the tube 12 in the area proximate the O-rings 62 is not necessary to create a seal between the fitting 14 and the tube 12. Given that each O-ring 62 is configured to seal against both the tube 14 and the structural portion 30, the use of multiple O-rings 62 provides a level of sealing redundancy. Of course, those skilled in the art will appreciate that sealing redundancy is optional and need not be employed.

As another example, the O-ring 68 of the seal portion 32 illustrated in FIG. 4 also seals against the inside surface 22 of the tube 12 upon insertion of the fitting 14 into the tube 12. The tube 12, however, is crimped or deformed so that the inside surface 22 of the end 42 of the tube 12 is abutted against the collar 66. The collar 66 serves to limit the deformation of the end 42 of the tube 12 so that the O-ring 68 is deformed in a predetermined manner, while the crimp or deformation serves to inhibit the withdrawal of the fitting 14 from the tube 12. Optionally, the collar 66 may also be deformed so as to provide additional sealing capacity between the tubular end 40 and the inside surface 22. In the example provided, a groove 102 in the collar 66 constrains the O-ring 68 to limit the manner and degree to which the O-ring 68 deforms and thereby ensure that the sealing integrity of the O-ring 68 is not compromised during the installation of the fitting 14.

Figure 9:
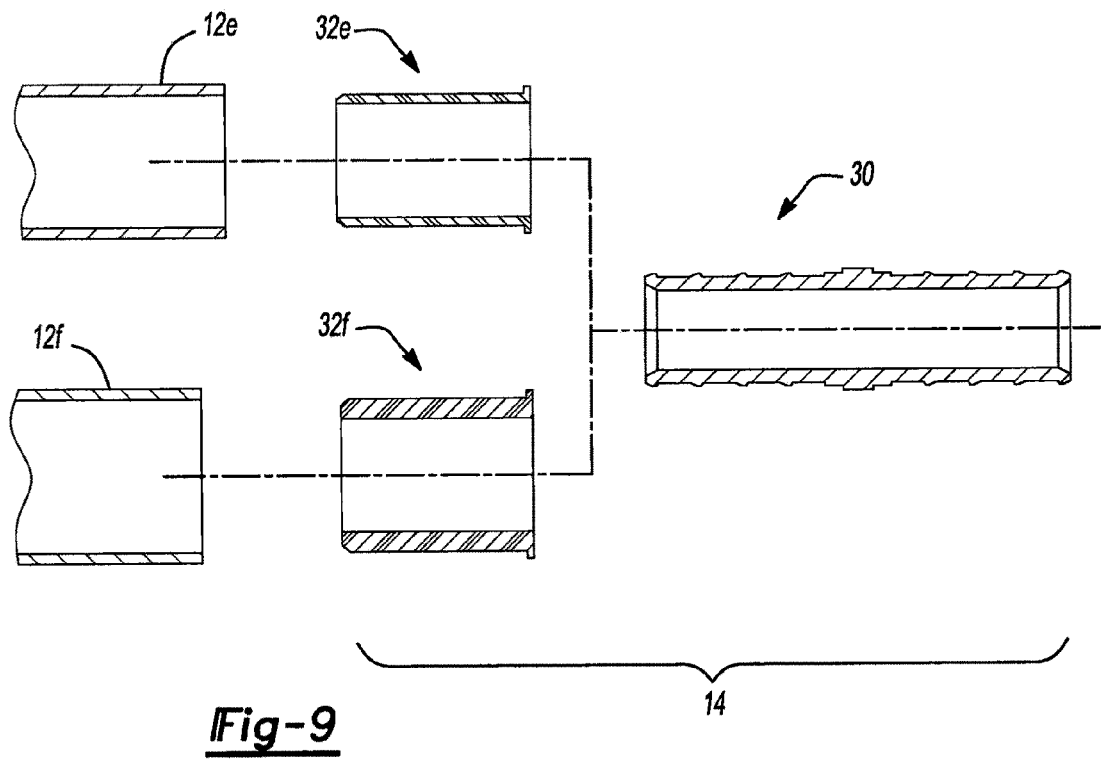
FIG. 9 is an exploded section view illustrating the use of the fitting of the present invention with differently sized tubes.

One aspect of the flexibility of our fluid conduit system is shown in FIG. 9 wherein the structural portion 30 of the fitting 14 is illustrated as being suitable for use with several differently sized tubes 12e and 12f. In this example, seal portions 32e and 32f are provided which vary in their outer diameter so as to be readily employed to seal against the inside surface of the tubes 12e and 12f, respectively. This flexibility is noteworthy since it permits significant reductions in the fabrication costs (e.g., tooling, losses in productivity as a result of changeover) of the fittings as compared to the known fittings, which are associated with a single and specific tube size.

Figure 10:
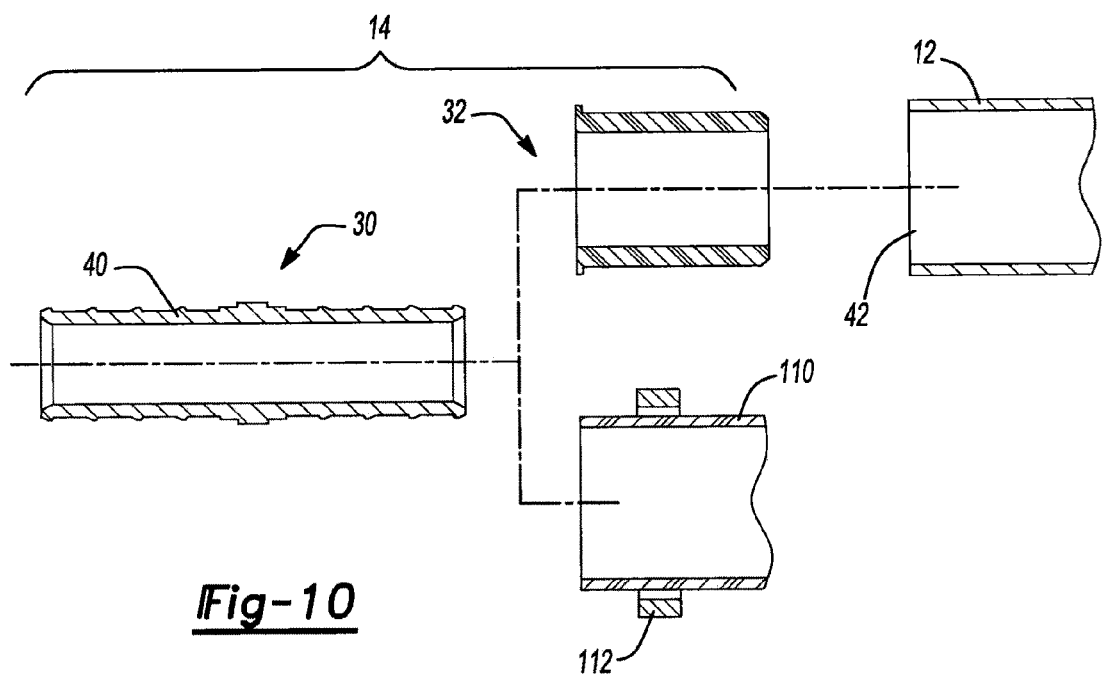
FIG. 10 is an exploded section view illustrating the use of the fitting of the present invention with different types of tubing materials.

Another aspect of the flexibility of our fittings 14 is illustrated in FIG. 10. In this example, the seal portion 32 is illustrated as being optional, so that the fitting 14 may be coupled to a tube 12 in accordance with the teachings of the present invention or to a different conduit material, such as commercially available PEX tubing 110. In situations where the structural portion 30 is to be coupled to a tube 12 in accordance with the teachings of the present invention, the seal portion 32 may be coupled or otherwise associated with the tubular end 40 and the fitting 14 installed into the tube 12. If, on the other hand, a different tubular material is to be employed, a different seal (not shown) may be employed or the seal portion 32 may be omitted altogether. In the example shown, the tubular end 40 of the structural portion 30 may be inserted into the PEX tubing 110 and coupled thereto in a conventional manner (as through an external crimp ring 112, for example). This flexibility is noteworthy since it facilitates a reduction in the overall quantity and cost of plumber's inventory through the stocking a single type of fitting that is suitable for use with several types of fluid conduit systems.

While the fitting 14 has been described thus far as including a generally cylindrical tubular end 40, those skilled in the art will appreciate that the invention, in its broader aspects, may be constructed somewhat differently. For example, the fitting may be formed with a bullhead 120 or such as shown in FIGS. 11 and 12 to further resist axial separation of the fitting 14 and the tube 12. In these embodiments, the tubular end 40*a* is installed to the end 42 of the tube and the end 42 of the tube 12 is crimped or deformed so as to define a reduced diameter portion 124 that abuts the bullhead 120 to thereby inhibit the withdrawal of the tubular end 40*a* from the tube 12. The fittings 14 of FIGS. 11 and 12 are illustrated to be substantially similar to one another, differing only in that the fitting 14 of FIG. 11 employs two O-ring seals 62, whereas the fitting 14 of FIG. 12 employs a sleeve 60 that is similar to that shown in FIG. 2 but which is overmolded onto or otherwise permanently secured to the tubular end 40*a* of the structural portion 30.

FIGS. 13 and 14 illustrate yet another embodiment of the fitting 14. In this embodiment, the tubular end 40*b* includes one or more grooves 130, which are illustrated to be U-shaped in the example provided. As with the fittings 14 that are illustrated in FIGS. 3 and 4, the seal portion 32 of the fittings 14 may be configured so as to seal against the inside surface 22 of the tube 12 upon insertion so that the tube 12 need not be deformed to effect sealing engagement between the seal portion 32 and either of the inside surface 22 of the tube 12 or the outside surface 51 of the tubular end 40 of the structural portion 30. In the particular example provided, no portion of the tube 12 in the immediate vicinity of each seal (e.g., O-ring 62) that forms the seal portion 32 is deformed.

Figure 15:
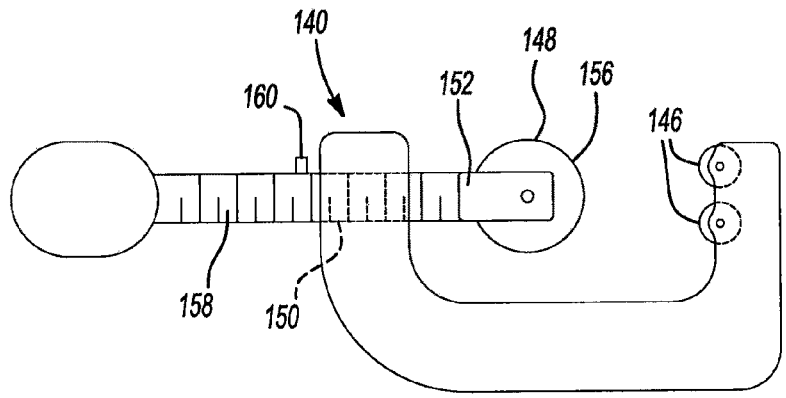
FIG. 15 is a side elevation view of another tool constructed in accordance with the teachings of the present invention.
Figure 16:
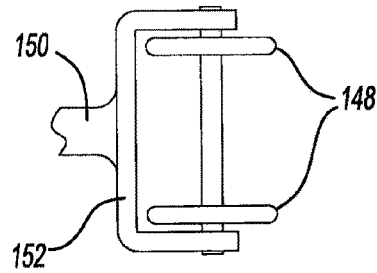
FIG. 16 is a front view of a portion of the tool of FIG. 15.

A tool may be employed to deform, crimp or extrude portions 142 of the tube 12 into each of the grooves 130 to thereby inhibit axial movement of the structural portion 30 relative to the tube 12. The tool may be powered by an appropriate means (e.g., manually, hydraulically, pneumatically or electrically). One suitable tool 140 is illustrated in FIGS. 15 and 16. The tool 140 is similar to a conventional tube cutter (e.g., similar to a No. 152 Tubing Cutter that is manufactured by the Ridge Tool Company) and includes a pair of rollers 146, which support and center the tube 12, one or more forming wheels 148 (two forming wheels 148 are employed in the example provided) and an incrementing mechanism 150 having a yoke 152 onto which the forming wheels 148 are rotatably mounted. Each forming wheel 148 includes an edge 156 that may have a shape that is complementary to the shape of the grooves 130 (FIG. 13). The incrementing mechanism 150 may include a screw jack 158 for adjustably moving the forming wheels 148 toward or away from the rollers 146. In operation, the tool 140 may be rotated about the tube 12 as the wheels 148 (via the incrementing mechanism 150) are moved toward the rollers 146, thereby causing the wheels 148 to push the portions 142 of the tube 12 into a corresponding one of the grooves 130 formed in the structural portion 30 of the fitting 14. Unlike a tube cutter, however, the tool 140 preferably includes an adjustable stop 160 for limiting the movement of the wheels 148 toward the rollers 146. Those skilled in the art will appreciate that the tool 140 may be equipped with one wheel 148 in the alternative.

Figure 17:
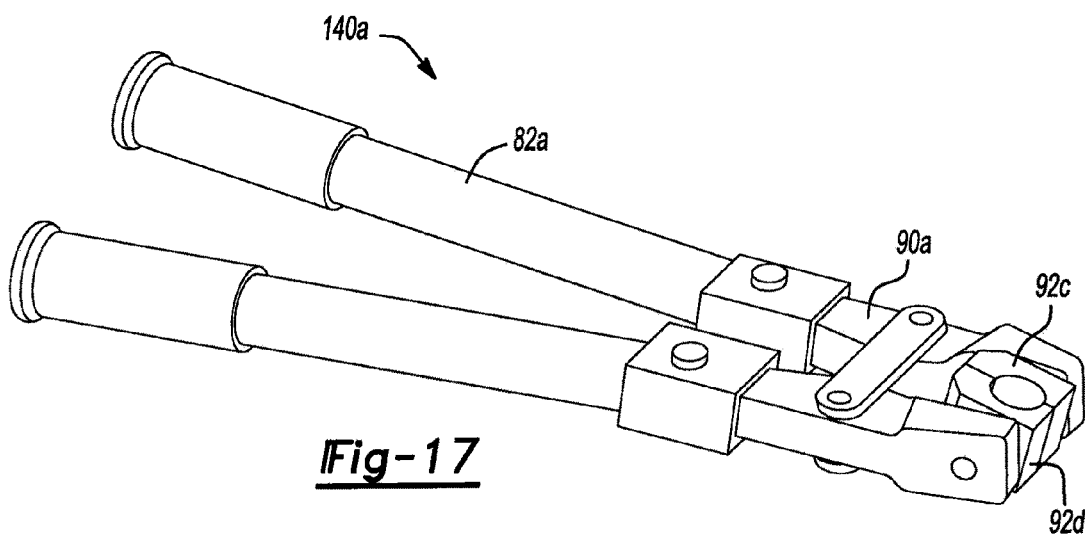
FIG. 17 is a front view of yet another tool constructed in accordance with the teachings of the present invention.
Figure 18:
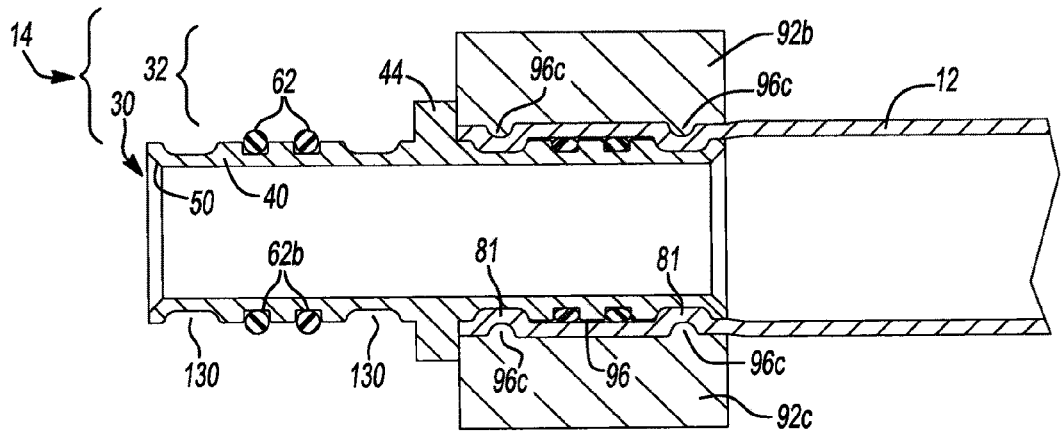
FIG. 18 is a sectional view of the tool shown in operative association with a tube and a fitting constructed in accordance with the teachings of the present invention.

Those skilled in the art will also appreciate from this disclosure that the tool 140 may be configured to locate on a surface of the abutting flange 44. Configuration of the tool in this manner permits the "forming means" to be positioned consistently relative to the grooves 130, provided that the structural portion 30 of the fitting 14 is constructed such that the distance between the surface of the abutting flange 44 and the grooves 130 remains relatively consistent from fitting 14 to fitting 14. Those skilled in the art will appreciate from this disclosure that either surface of the abutting flange 44 may be selected as the "datum surface". In the example of FIGS. 17 and 18, the "near side" of the abutting flange 44 (i.e., the surface of the abutting flange 44 immediately adjacent the end 40 of the structural portion 30 being fastened to a tube 12) was chosen to locate the crimps 81 relative to the abutting flange 44, as the ability to locate the tool 140*a* by pushing it against the abutting flange 44 was preferred.

The tool 140*a* may include a tool body 82*a* and a jaw 90*a*, which may be generally similar to the configuration of a commercially available bolt cutter. The tool 140*a* may further include a pair of discrete die members 92*c* and 92*d*, which are generally similar to the die members 92*a* and 92*b*, discussed above (i.e., rotatable about an axis that is generally perpendicular to the tube 12). Alternatively, the die members 92*c* and 92*d* may be fixed in a stationary (i.e., non-rotating) position. The die members 92*c* and 92*d* may be fixedly but removably coupled to the jaw 90*a* and may include projections 96*c* that extend into the die cavity 96. Depending on the desired configuration of the crimp 81, the projections 96*c* may be formed about the perimeter of the die cavity 96 so that the crimp 81 will be substantially continuous about the perimeter of the tube 12, or may extend partially about the perimeter of the die cavity 96. Operation of the tool body 82*a* (i.e., moving the handles of the tool body 82*a* relative to one another) opens and closes the jaw 90*a* in a conventional and well known manner to thereby move the die members 92*c* and 92*d* relative to one another. In the alternative, the tool may be configured to utilize the opposite side (i.e., "far side") of the abutting flange 44 or both sides of the abutting flange 44 to locate the tool relative to the grooves 130 with appropriate modifications to the tool (e.g., to the die members).

One or both of the die members (e.g., 92*c* and/or 92*d*) may include indicia for stamping, embossing or otherwise marking the tube 12 with a mark in an area proximate the fitting 14 so as to identify that the crimp or crimps 81 had been formed with a suitable (e.g., approved, licensed) tool. In the example provided, the indicia is a raised mark identified by the reference letter T in FIG. 17, which as those of ordinary skill in the art will appreciate, stamps a mark into the tube 12 when the die members 92*c* and 92*d* are closed on the tube 12 to form the crimps 81. The indicia or mark may be of any desired form and may be a trademark of the tool, the fittings and/or the fluid conduit system. In the example provided, the raised mark T is a symmetrical trademark that is associated with the tool, the fittings and the fluid conduit system. While the raised mark T may be located anywhere along the length of the die members 92*c* and/or 92*d*, we chose a location proximate the abutting flange 44. Accordingly, the raised mark T may be employed not only to identify whether a suitable tool had been employed to form the crimps 81, but also to indicate whether the fitting 14 had been installed to the tube 12 properly prior to the formation of the crimps 81. For example, if the fitting 14 was not fully installed to the tube 12, the mark on the tube 12 that is formed by the raised mark may "fall off" the end of the tube so as to be incomplete or missing altogether. Similarly, the position of the mark on the tube 12 that is formed by the raised mark T relative to the abutting flange 44 may be employed to identify situations where the dies 92c and 92d were not abutted against the abutting flange 44 prior to forming the crimps 81.

Figure 19:
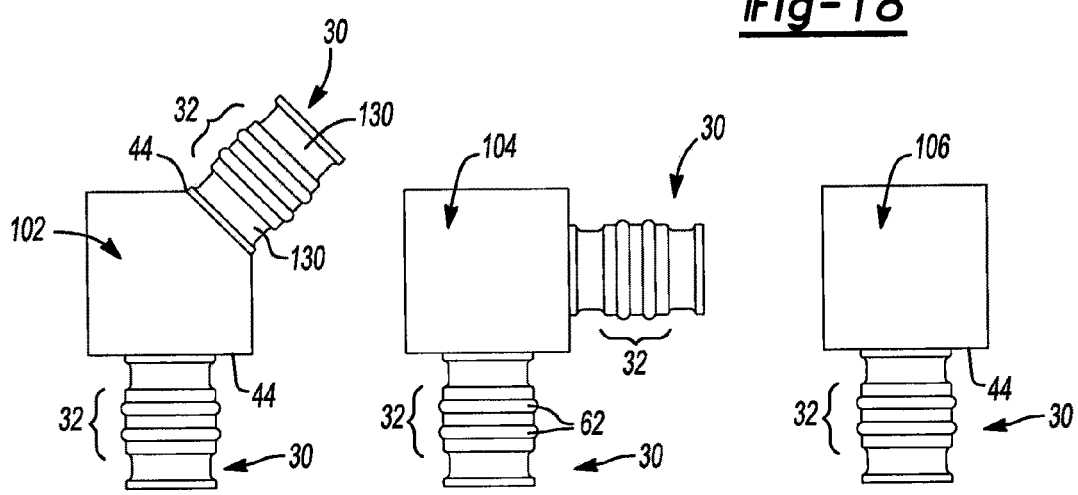
FIG. 19 is an exemplary family of fittings constructed in accordance with the teachings of the present invention.
Figure 19:
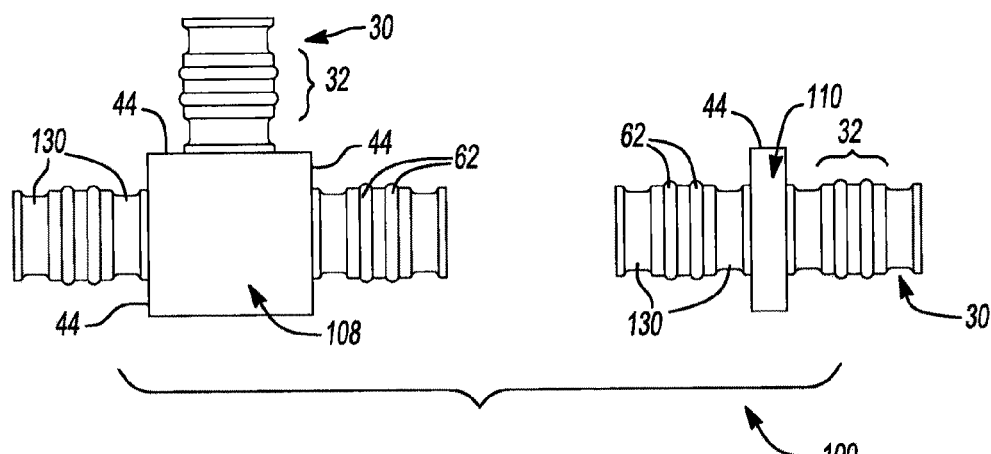
Figure 20:
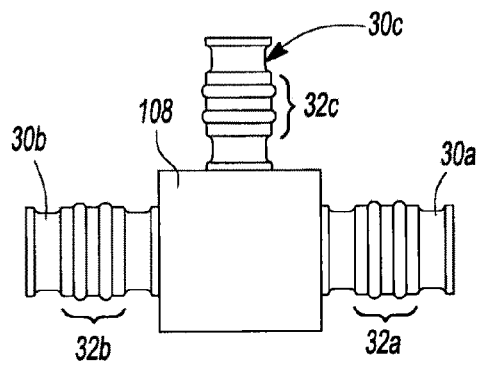
FIG. 20 is an illustration of an exemplary reducing fitting constructed in accordance with the teachings of the present invention.

With reference to FIG. 19, a family of fittings constructed in accordance with the teachings of the present invention is generally indicated by reference numeral 100. The family of fittings 100 may include a 45° elbow 102, a 90° elbow 104, a cap 106, a tee 108 and a union 110. Each member of the family of fittings 100 includes a structural portion 30 and a seal portion 32 which are generally similar to those that are illustrated in FIG. 13 except that the grooves 130 on the structural portion 30, while still being generally U-shaped, are somewhat wider and less rounded. Although the tee, elbow and union fittings of the family of fittings 100 are illustrated as employing two or more structural portions 30 and seal portions 32 that are identically sized, those skilled in the art will appreciate from this disclosure that they may be formed such that one or more of the structural portions 30 and/or seal portions 32 is differently sized from a remaining one of the structural portion 30 and/or seal portion 32. For example, the tee 108 in FIG. 20 is illustrated as having structural portions 30a, 30b and 30c and seal portions 32a, 32b and 32c wherein structural portion 30c and seal portion 32c are sized differently (i.e., smaller in the particular example show) than structural portions 30a and 30b and seal portions 32a and 32b, respectively.

Figure 21:
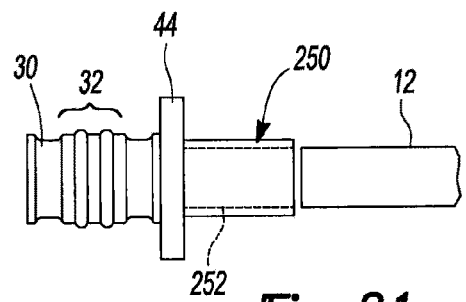
FIG. 21 is an illustration of another exemplary fitting constructed in accordance with the teachings of the present invention.

Those skilled in the art will appreciate from this disclosure that the family of fittings 100 may include various "adapter fittings", having the above-discussed structural portion 30 and seal portion 32 on one end and another plumbing configuration 252 on the opposite end 250, as is illustrated in the example of FIG. 21. While FIG. 21 illustrates that the other plumbing configuration 252 may be a solder connection, those skilled in the art will appreciate from this disclosure that various other known plumbing connections, such as a compression fitting, a flare fitting, male pipe threads, and female pipe threads, may also be employed.

Figure 22:
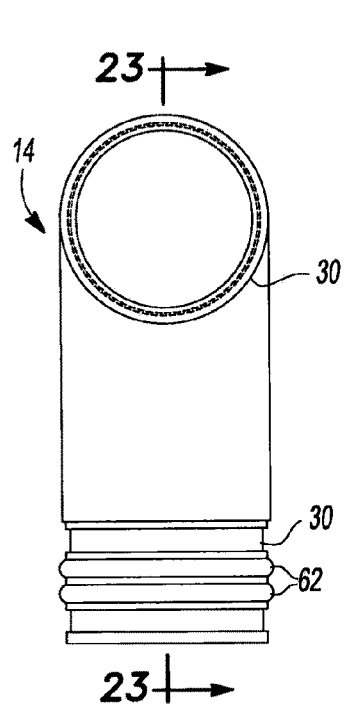
FIG. 22 is an side elevation of another fitting constructed in accordance with the teachings of the present invention.
Figure 23:
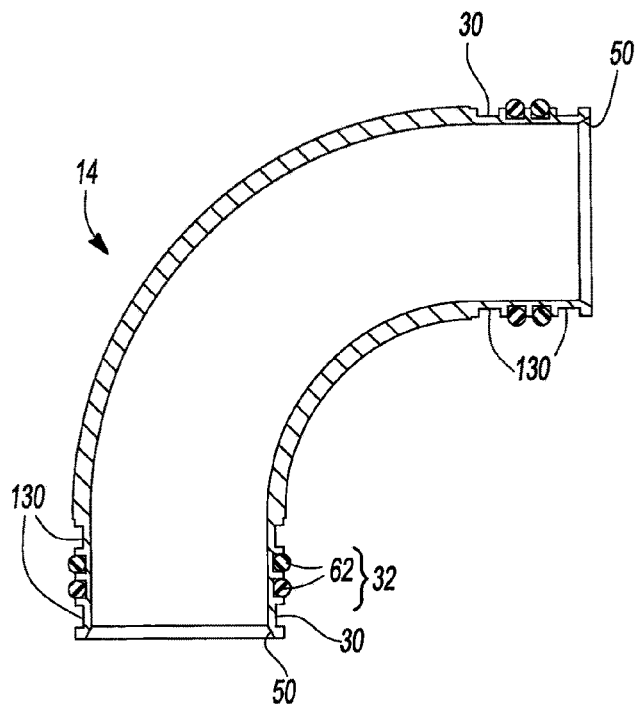
FIG. 23 is a sectional view taken along the line 23-23 of FIG. 22.

Those skilled in the art will also appreciate from this disclosure that the 45° and 90° elbows may be formed somewhat differently from that which is illustrated in FIG. 19 to provide a gradual bend as the fitting changes direction, as conventional solder fittings are typically constructed. With reference to FIGS. 22 and 23, an exemplary 900 fitting 14 constructed in accordance with the teachings of the present invention is illustrated. The structural portions 30 of the fitting 30 may include a chamfer 50 that extends about the interior edge of the structural portion 30.

Figure 24:
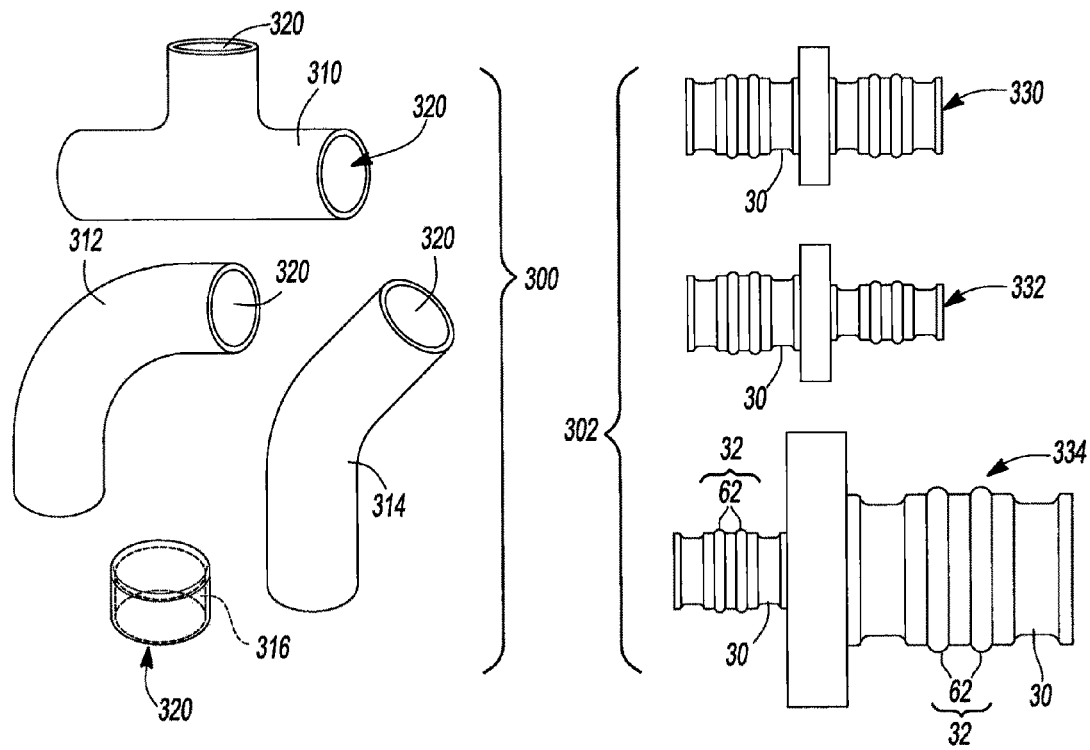
FIG. 24 is an illustration of a portion of yet another set of fittings constructed in accordance with the teachings of the present invention.

Another fluid conduit system constructed in accordance with the teachings of the present invention is illustrated in FIG. 24. In this example, the fluid conduit system includes a family of first fittings 300 and a family of second fittings 302. The family of first fittings 300 may include a tee fitting 310, a 90° elbow fitting 312, a 45° elbow fitting 314 and a cap fitting 316 that are generally similar to standard solder-type fittings except that their openings 320 have an inner diameter that is similar to the inner diameter of the tubes 12 (FIG. 1), whereas standard solder-type fittings have openings with an inner diameter that is similar to the outer diameter of the tubes 12. The second fittings 302 include various types of unions, including "straight" unions 330 and reducing unions 332, 334. One advantage of this fluid conduit system is that the plumbing contractor need not stock specific types of reducing fittings (i.e., tees and elbows), as any reductions may be made through use of a reducing union. Another advantage of this fluid conduit system is that the family of first fittings 300 may be produced and marketed with or without pre-installed fittings from the family of second fittings 302 as shown in FIG. 25.

Figure 25:
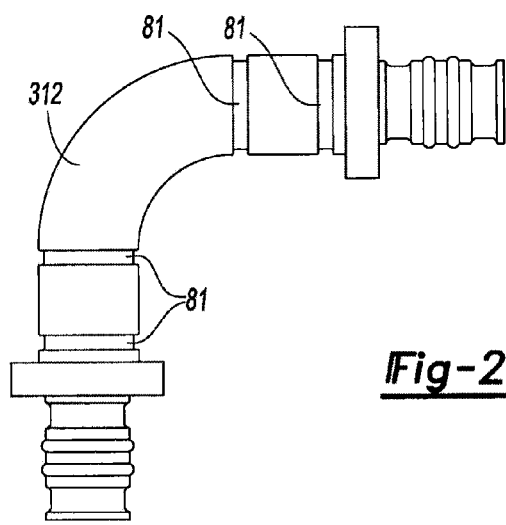
FIG. 25 is a side elevation of an assembled pair of the fittings that are shown in FIG. 24.
Figure 26:
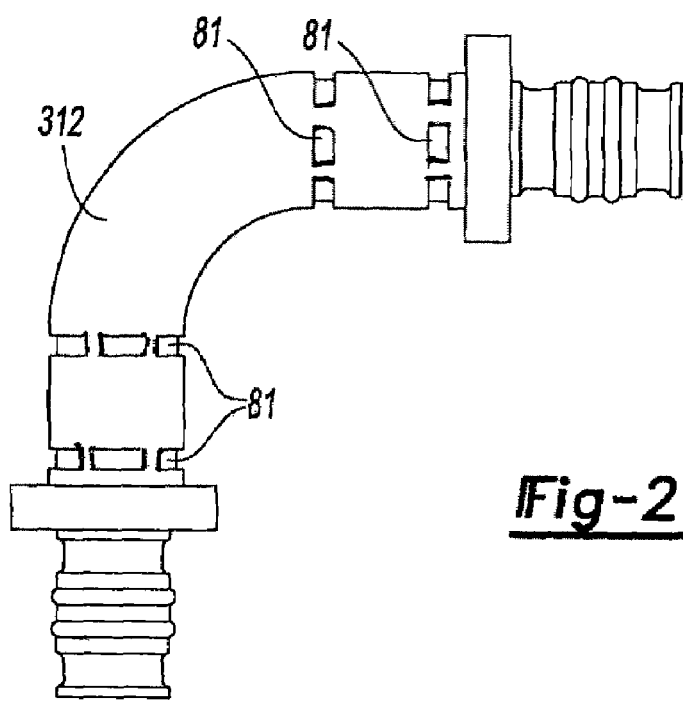
FIG. 26 is a side elevation similar to that of FIG. 25 but illustrating the assembly as employing crimps having crimp sections that extend only partially about the perimeter of the fluid conduit.

FIG. 26 illustrates a fluid conduit system similar to that of FIG. 25 but which employs crimps 81 that have one or more crimp sections 81a that extend about a portion of the perimeter of the elbow fitting.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A fluid conduit system comprising:
    a fluid conduit having an inner diameter and an end;
    first and second crimps formed on the fluid conduit, each of the first crimp and the second crimp having an inside dimension that is smaller than the inner diameter; and
    a filling received in the fluid conduit and having a structural portion and a seal portion, the structural portion being unitarily formed and extending outwardly from the end of the fluid conduit, the structural portion having first and second crimp grooves into which the first and second crimps, respectively, are at least partially received, each of the first and second crimp grooves extending in an unbroken, continuous manner about the entire circumference of the structural portion, the seal portion being carried by the structural portion and sealingly engaging the inner diameter of the fluid conduit, the seal portion being disposed between and axially offset from the first and second crimp grooves;
    wherein the fluid conduit is entirely formed of metal such that the seal portion is sealing engaged directly to the metal of the fluid conduit and wherein the first and second crimps are permanently formed directly into the metal of the fluid conduit.

2. The fluid conduit system of claim 1, wherein the filling further includes an annular flange that is axially spaced apart from the crimp groove by a predetermined distance.

3. The fluid conduit system of claim 1, wherein the seal portion includes an elastomeric seal.

4. The fluid conduit system of claim 3, wherein the elastomeric seal includes at least one O-ring.

5. The fluid conduit system of claim 1, wherein at least a portion of the fluid conduit is formed of hard drawn tubing sticks.

6. The fluid conduit system of claim 1, wherein at least a portion of the fluid conduit is formed of flexible metal tubing.

7. The fluid conduit system of claim 1, wherein the crimp groove is generally U-shaped.

8. The fluid conduit system of claim 1, wherein the seal portion includes a plurality of discrete seal members, each seal member being configured to sealingly engage the inner diameter of the fluid conduit.

9. The fluid conduit system of claim 1, wherein the crimp extends in a continuous manner about the perimeter of the fluid conduit.

10. The fluid conduit system of claim 1, wherein the crimp comprises at least one crimp section, each crimp section extending only partially about the perimeter of the fluid conduit.

11. The fluid conduit system of claim 1, wherein the seal portion includes a first seal and a second seal that is axially spaced apart from the first seal.

12. A fluid conduit system comprising:

a fluid conduit having an inner diameter and an end;

first and second crimps formed on the fluid conduit, each of the first crimp and the second crimp having an inside dimension that is smaller than the inner diameter; and a fitting received in the fluid conduit and having a structural portion and a seal portion, the structural portion being unitarily formed and extending outwardly from the end of the fluid conduit, the structural portion having first and second crimp grooves into which the first and second crimps, respectively, are at least partially received, each of the first and second crimp grooves extending about the circumference of the structural portion, the seal portion being carried by the structural portion and sealingly engaging the inner diameter of the fluid conduit, the seal portion being disposed between and axially offset from the first and second crimp grooves;

wherein the fluid conduit includes a metal tube and wherein the first and second crimps are permanently formed directly into the metal tube;

wherein a portion of the fluid conduit between the first and second crimps is deformed inwardly to sealingly engage the seal portion.

13. A fluid conduit system comprising:

a fluid conduit having an inner diameter and an end;

a sleeve received in the end of the fluid conduit;

a fitting received through the sleeve and extending from the end of the fluid conduit, the fitting including a plurality of discontinuities that are disposed along a length of the sleeve; and a crimp formed on the fluid conduit, the crimp having an inside dimension that is smaller than the inner diameter and urging the sleeve into sealing engagement with the fluid conduit and the fitting, wherein the sleeve is engaged to the discontinuities on the sleeve;

wherein the sleeve has a length that is less than a length of the fitting such that the sleeve does not extend into the fluid conduit past the fitting;

wherein the sleeve carries an O-ring seal.

14. The fluid conduit system of claim 13, wherein the discontinuities are selected from a group comprising steps, grooves, recesses, teeth, barbs and combinations thereof.

15. The fluid conduit system of claim 13, further comprising a crimp ring that is disposed about the fluid conduit in the crimp.

16. The fluid conduit system of claim 13, wherein the fluid conduit is formed of hard drawn tubing sticks.

17. The fluid conduit system of claim 13, wherein at least a portion of the fluid conduit is formed of flexible metal tubing.

* * * * *

UNITED STATES PATENT AND TRADEMARK OFFICE
CERTIFICATE OF CORRECTION

PATENT NO. : 7,516,990 B2  Page 1 of 1
APPLICATION NO. : 10/739983
DATED : April 14, 2009
INVENTOR(S) : Tommy L. Jamison It is certified that error appears in the above-identified patent and that said Letters Patent is hereby corrected as shown below:

Column 3, Line 37
"an side" should be -- a side --;

Column 4, Line 7
"it's" should be -- its --;

Column 7, Line 10
After "stocking" insert -- of --;

Column 9, Line 27
"show" should be -- shown --;

Column 9, Line 46
"900" should be -- 90° --.

Signed and Sealed this

Twenty-fourth Day of November, 2009

David J. Kappos
*Director of the United States Patent and Trademark Office*